United States Patent
Liu et al.

(10) Patent No.: US 8,326,575 B1
(45) Date of Patent: Dec. 4, 2012

(54) MACHINE-BASED POPULATION STABILITY INDEX SELECTION

(75) Inventors: Hemei Liu, Wilmington, DE (US);
Gerald F. Parise, Moorestown, NJ (US);
Lewis R. Ware, Hockessin, DE (US)

(73) Assignee: Bank of America Corporation, Charlotte, NC (US)

( * ) Notice: Subject to any disclaimer, the term of this patent is extended or adjusted under 35 U.S.C. 154(b) by 781 days.

(21) Appl. No.: 12/390,670

(22) Filed: Feb. 23, 2009

(51) Int. Cl.
*G06F 17/00* (2006.01)

(52) U.S. Cl. .................................... 702/179; 702/187

(58) Field of Classification Search .............. 702/179, 702/187; 700/51; 379/88.09; 73/156
See application file for complete search history.

(56) References Cited

U.S. PATENT DOCUMENTS

| | | | |
|---|---|---|---|
| 4,773,861 A * | 9/1988 | Dufour | 434/135 |
| 5,655,074 A * | 8/1997 | Rauscher | 714/38.1 |
| 7,684,959 B2 * | 3/2010 | Garzia et al. | 702/182 |

\* cited by examiner

*Primary Examiner* — Michael Nghiem
*Assistant Examiner* — Elias Desta
(74) *Attorney, Agent, or Firm* — Weiss & Arons LLP; Michael Springs (57) ABSTRACT

Apparatus and methods for quantifying a difference between a first population distribution data set and a second population distribution data set. The apparatus and methods may use randomly generated population distribution differences to generate a mapping of a population stability index to a population distribution difference function. The population distribution difference function may be more responsive to some differences between the first and second population distribution data sets than is the population stability index. The population distribution difference function thus may be used to identify differences between population distribution data sets. The differences may then be mapped to a corresponding population stability index. The population stability index may then be used to quantify a difference between the first and second data sets.

23 Claims, 4 Drawing Sheets

MACHINE-BASED POPULATION STABILITY INDEX SELECTION

FIELD OF TECHNOLOGY

Aspects of the disclosure relate to providing apparatus and methods for identifying differences between frequency distributions. In particular, the disclosure relates to apparatus and methods for selecting a population stability index threshold for identifying differences between population distributions.

BACKGROUND

An entity may seek to monitor changes in an attribute associated with members of a population. The members may be individuals or things. The attribute may be quantified for each member of the population. For example, each member may be "scored" with respect to the attribute. The score may indicate the extent to which, or the likelihood that, the member possesses the attribute. The members' scores may change over time.

One way to characterize the presence of the attribute at a selected time is to formulate a distribution showing how likely the attribute is to occur in portions of the population. The entity may desire to modify its own behavior based on observed changes in the distribution. The entity may use an objective index, such as a population stability index, to quantify the change.

For example, the entity may seek to monitor an attribute such as an economic behavior of the entity's customers. In the financial services industry, for example, financial services companies often monitor credit-related behavior of a population of its customers.

One form of credit-related behavior may include when a customer accumulates debt on a credit account and cannot repay the debt. A financial services company may seek to monitor risk that is associated with a population of its customers. The population may include all or a portion of its customers. A change in conditions, such as economic conditions, political conditions, weather conditions and the like, may modify the risk associated with the population.

Table 1 shows a typical use of a population stability index to characterize a change between a typical model score distribution based on a typical development data set and the model score distribution based on a typical validation data set. The model score indicates likelihood of inability to pay off a debt based on a credit behavior model.

TABLE 1

Population Stability Index ("PSI").

| Decile | Model score distribution for a development dataset | Model score distribution for a validation dataset | Score range contribution |
|---|---|---|---|
| 1 | 10% | 20% | 0.069314718 |
| 2 | 10% | 9% | 0.001053605 |
| 3 | 10% | 9% | 0.001053605 |
| 4 | 10% | 9% | 0.001053605 |
| 5 | 10% | 9% | 0.001053605 |
| 6 | 10% | 9% | 0.001053605 |
| 7 | 10% | 9% | 0.001053605 |
| 8 | 10% | 9% | 0.001053605 |
| 9 | 10% | 9% | 0.001053605 |
| 10 | 10% | 8% | 0.004462871 |
| Total | 100% | 100% | 0.08220643 (=PSI[1]) |

[1]Population Stability Index may, in some disciplines, be referred to as "Information Value."

The deciles in Table 1 define a distribution of a model score among the members of a customer population. The model score corresponds to the likelihood of inability to pay a debt. Decile 1 represents the highest likelihood (Model Score=91-100%) of inability to pay a debt. Decile 10 represents the lowest likelihood of inability to pay a debt (Model Score=1-10%).

The model score distribution in a development data set shows, for each decile, the percentage of the population at a first time that received a score corresponding to the decile.

The model score distribution for a validation data set shows, for each decile, the percentage of the population at a second time that received a score corresponding to the decile. The most noticeable change is a doubling of the portion of the population that scored in the highest decile.

Equation 1 shows how score range contribution is evaluated, for each decile i, from the development distribution and the validation distribution.

$$\text{Score Range } Contribution_i = \text{(Validation \%}_i - \text{Development \%}_i) \cdot \text{Ln}\left(\frac{\text{Validation \%}_i}{\text{Development \%}_i}\right) \quad \text{Eqn. 1}$$

Table 1 shows the score range contribution for each of the i deciles. (A decile includes 10 percentage points that define a score range.) Validation % for each decile is taken from the model score distribution from the validation data set. Development % for each decile is taken from the model score distribution from the development data set.

Equation 2 shows how Population Stability Index is evaluated from the score range contributions of the 10 deciles.

$$PSI = \sum_{i=1}^{10} \text{Score Range } Contribution_i \quad \text{Eqn. 2}$$

PSI for the example in Table 1, as shown at the bottom of Table 1, is 0.08220643.

A greater PSI value indicates a larger shift in a distribution (e.g., between the development and validation distributions). Typically, in the financial services industry, widely accepted threshold PSI values are believed to correspond to different levels of population stability. Table 2 shows those PSIs and corresponding stability levels.

TABLE 2

PSIs and corresponding stability levels.

| PSI | Stability level |
|---|---|
| <0.1 | Stable |
| 0.1-0.3 | Slight shift |
| >0.3 | Significant shift |

The PSI in the example shown in Table 1 is less than 0.1. According to the scheme shown in Table 2, such a PSI indicates that the population characterized in Table 1 is stable. If the entity's decisions are based on the Table 2 scheme, then, the large increase (a doubling) of the decile 1 proportion in the validation distribution (relative to the development distribution) would go unnoticed. This would be particularly true if the Table 2 scheme were the basis for an automatic stability alert that is generated by a computational machine. The Table 2 scheme therefore may be inadequate for the identification of population shifts that are economically meaningful.

Also, the Table 2 scheme is typically used in the context of six- to 12-month population shifts. Shifts over such a time scale may be large enough to generate PSIs that are sufficient to cause the Table 2 scheme to indicate slight to significant shifts. When analyzing shifts over a shorter time period, however, even economically significant shifts may not generate PSIs that are large enough to cause the Table 2 scheme to indicate slight to significant shifts and may therefore be overlooked.

It would be desirable, therefore, to provide apparatus and methods for selecting PSI values that correspond to population stability.

SUMMARY OF THE INVENTION

Apparatus and methods for quantifying a difference between a first population distribution and a second population distribution are provided. The apparatus and methods may use randomly generated population distribution differences to map a population stability index to a population distribution difference function.

The magnitudes of both the population stability index and the population distribution difference function may increase with increasing differences between the population distributions. However, the population distribution difference function may be more sensitive than is the population stability index to such differences.

The population distribution difference function, therefore, may be more useful than the population stability index for identifying differences between the population distributions. On the other hand, it may be desirable to analyze and report population distribution differences in terms of population stability indices. A population distribution difference threshold may thus be identified using a population distribution difference function. The threshold difference may then be translated to a critical value of a corresponding population stability index. The population stability index may then be used to quantify a difference between the first and second data sets. In a monitoring context, the apparatus and methods may use the critical value as basis for signaling when the population stability index meets or exceeds the critical value.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Apparatus and methods for quantifying a difference between a first population distribution data set and a second population distribution data set are provided. The apparatus and methods may involve a machine computational module that is configured to map a population stability index to a population distribution difference function. The machine computational module may be used to evaluate the population stability index based on the first population distribution data set and the second population distribution data set.

The population distribution difference function may be responsive to a difference between the first population distribution data set and the second population data set. By mapping the population stability index to the population distribution difference function, the population distribution difference function can be used to identify such a difference.

The population distribution difference function may be responsive to an intuitively relevant difference between the first and second data sets. The population stability index may not be responsive to the intuitively relevant difference. By mapping the population distribution difference function to the population stability index, a user may choose values of the population stability index that correspond to intuitively correct values of the population distribution difference function. Values of the population stability index that are so chosen may be referred to as "critical values."

The user may then use such a critical value in conjunction with a population stability index analysis of the first and second population distribution data sets. For example, if the population stability index meets or exceeds the critical value, the difference between the population distribution data sets may be characterized as requiring responsive action.

In some embodiments, the critical value may be stored in machine readable memory. If the population stability index based on the first population distribution data set and the second population distribution data set satisfy a criterion based on the critical value, an alert may be generated.

The first and second population distribution data sets may correspond, respectively, to a first population and a second population. The first and second population may be different populations of individuals. The first and second population may be different populations of customers. The first and second population distribution data sets may correspond, respectively, to a population of individuals at a first time and the same population of individuals at a second time.

In some embodiments, the population distribution difference function may be based on absolute differences between the first and second population distribution data sets. For example, the population distribution difference function may be an absolute difference function, such as that defined by Equation 3.

$$\text{Absolute Difference} = \sum_{i=1}^{I} |PDS2_i - PDS1_i| \qquad \text{Eqn. 3}$$

In Equation 3, PDS1 and PDS2 are the first and second population distributions, i indicates a subset of an independent variable, such as a range of charge off risk score, and I is the total number of subsets. For example, if the population distributions are expressed in deciles, i may have 10 values that range from one (a first decile) to 10 (a tenth decile). The argument of the absolute value in Equation 3 would then be, for a selected decile, the difference between the portions of the first and second populations that received a charge off risk score in that decile. The absolute difference would then be the sum of such differences over all of the deciles.

The mapping between the population stability index and the population distribution difference function may be any appropriate mapping. For example, the mapping may be based on a randomly generated hypothetical third data set.

In some embodiments, Monte Carlo simulation may be used to generate a family of third data sets. The family of third data sets may include a large number of possible population distributions. Based on the family of third data sets, a family of differences (each being the difference between one of the third data sets and the first data set) may be characterized in two different ways: first, using a population stability index and, second using a population distribution difference function. Each difference in the family of differences would thus correspond to a population stability index and a population distribution difference function value. The corresponding population stability indices and population distribution difference functions may then be used to establish the mapping between the population stability index and the population distribution difference function.

The third data sets may represent population distributions that have any suitable distribution form. For example, the distributions may be linear, non-linear, monotonic, monomodal, bimodal or in any other form. When a random process is used to generate the third data sets, the process may be suitably constrained. For example, each of the third data sets may be constrained such that 100% of the hypothetical population underlying each hypothetical third distribution is distributed to each of the independent variable subsets (such as the deciles).

In some embodiments, 100,000 third data sets may be generated by the random process. Each of the third data sets may be based on a distinct random number seed.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
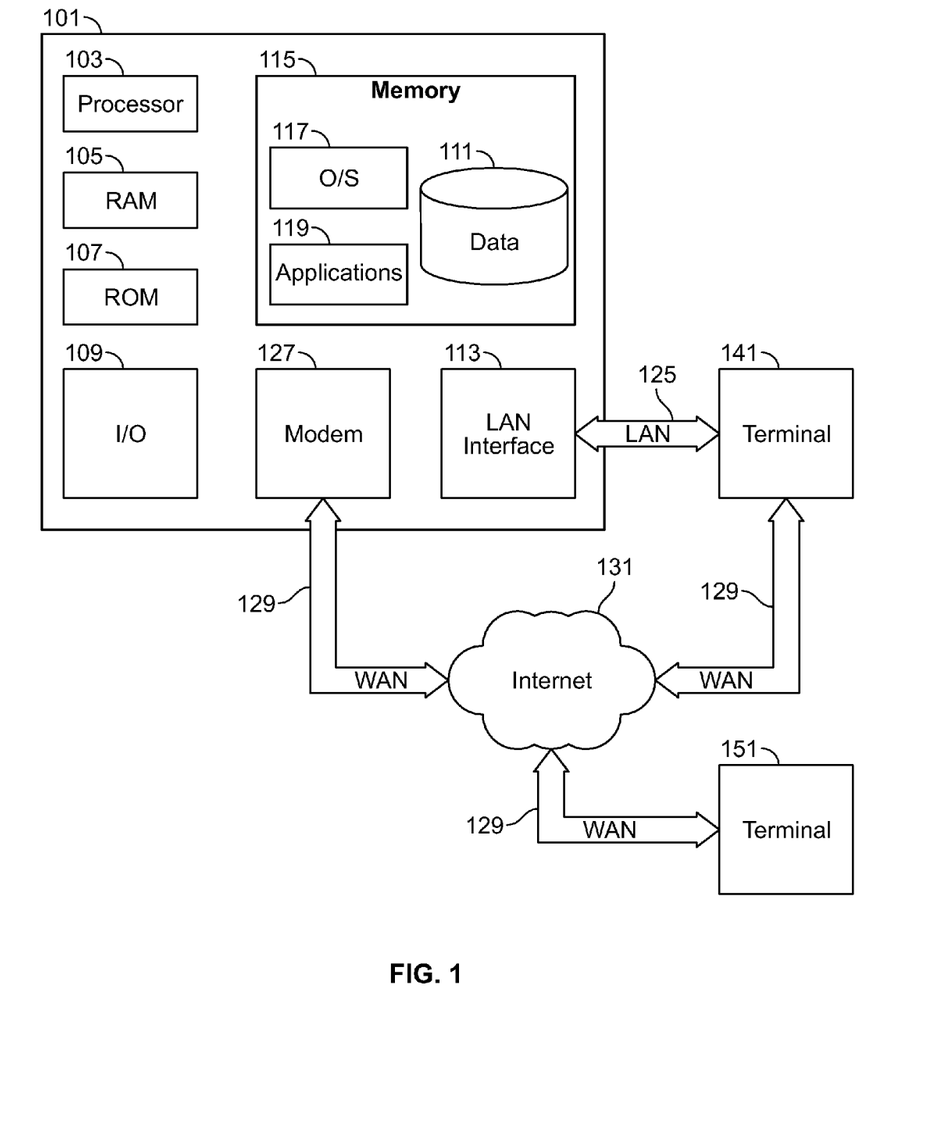
FIG. 1 shows apparatus that may be used in accordance with the principles of the invention.

FIG. 1 is a block diagram that illustrates a generic computing device 101 (alternatively referred to herein as a "server") that may be used according to an illustrative embodiment of the invention. The computer server 101 may have a processor 103 for controlling overall operation of the server and its associated components, including RAM 105, ROM 107, input/output module 109, and memory 125.

Input/output ("I/O") module 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 125 and/or storage to provide instructions to processor 103 for enabling server 101 to perform various functions. For example, memory 125 may store software used by server 101, such as an operating system 117, application programs 119, and an associated database 121. Alternatively, some or all of server 101 computer executable instructions may be embodied in hardware or firmware (not shown). As described in detail below, database 121 may provide storage for population member scoring algorithms, population member scores, population distribution data, population distribution analysis algorithms, population distribution display tools and any other suitable information.

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 123. When used in a WAN networking environment, server 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

Terminal 151 and/or terminal 141 may be portable devices such as a laptop, cell phone, blackberry, or any other suitable device for storing, transmitting and/or transporting relevant information.

Any information described above in connection with database 121, and any other suitable information, may be stored in memory 125.

One or more of applications 119 may include one or more algorithms that may be used to score population members, analyze population distribution data sets, perform mapping between functions or value sets and perform any other suitable tasks related to population change analysis.

The invention may be operational with numerous other general purpose or special purpose computing system environments or configurations. Examples of well known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
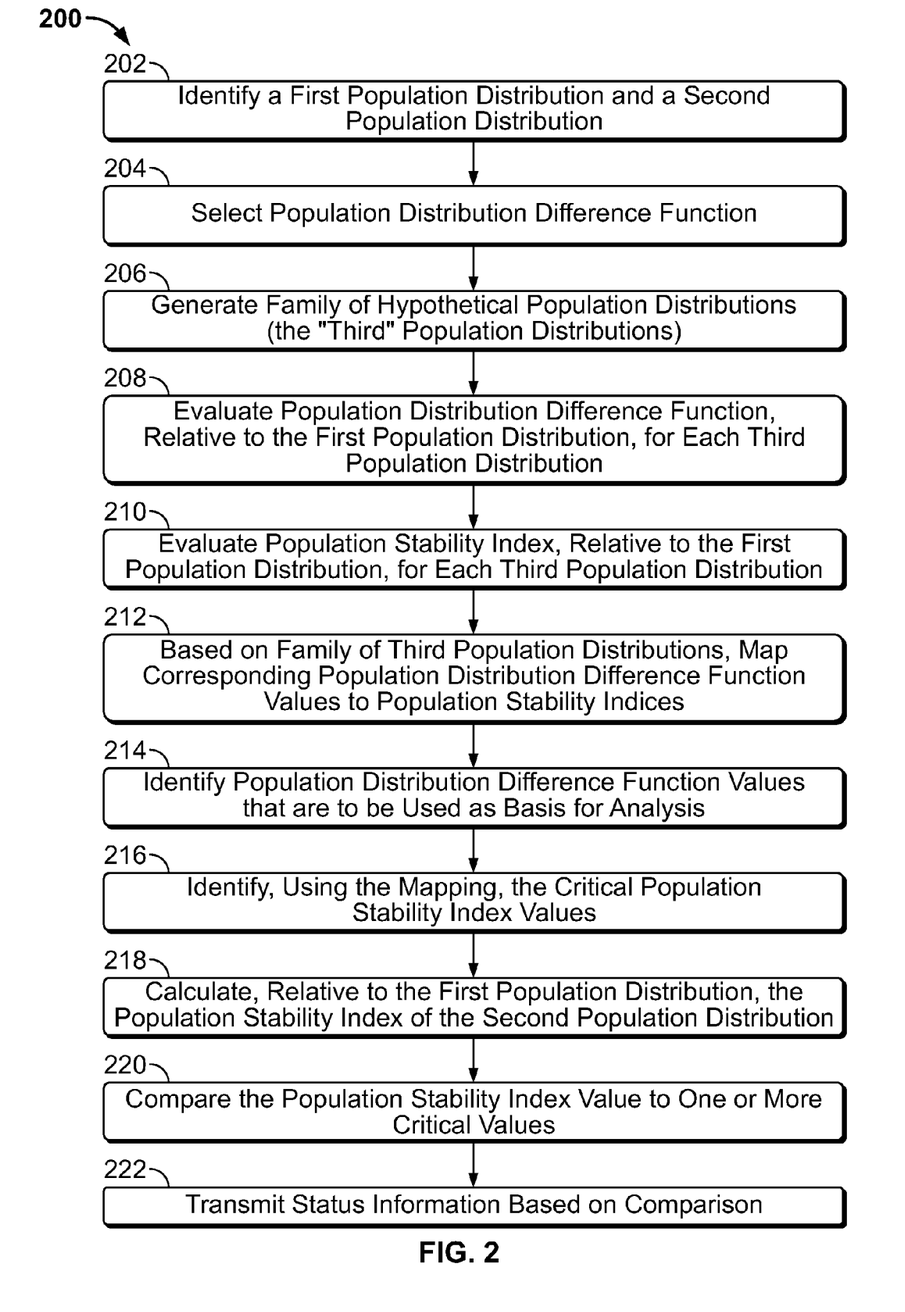
FIG. 2 shows steps of a process in accordance with the principles of the invention.

Processes in accordance with the principles of the invention may include one or more features of the process illustrated in FIG. 2. For the sake of illustration, the steps of the process illustrated in FIG. 2 will be described as being performed by a "system". The "system" may include one or more of the features of the apparatus that are shown in FIG. 1 and/or any other suitable device or approach. The "system" may be provided by an entity. The entity may be an individual, an organization or any other suitable entity.

FIG. 2 shows illustrative process 200 for selecting a population stability index critical value. Process 200 may begin at step 202. At step 202, a first population distribution and a second population distribution may be identified. It may be desired to characterize a difference between the first and second population distributions. At step 204, a population distribution difference function may be selected. The distribution difference function may quantify the difference between the first and second population distributions. Any suitable population distribution function may be used.

At step 206, a family of hypothetical population distributions (the "third" population distributions) may be generated. The family may be generated by a random process, such as a Monte Carlo process. At step 208, the population distribution difference function may be evaluated, relative to the first population distribution, for each third population distribution.

At step 210, the population stability index may be evaluated, relative to the first population distribution, for each third population distribution.

At step 212, values of the population distribution difference function based on the first and third population distributions may be mapped to values of the population stability index based on the same distributions.

At step 214, one or more population distribution difference function values may be selected. The values may be selected for their correspondence with population distribution differences that have significance. The significance may be based on objective or subjective criteria. The significance may be based on economic differences, business-based differences, financial differences, physical differences, chemical differences, biological differences or any other suitable differences.

At step 216, values of the population stability indices that correspond to the selected population distribution difference function values may be identified using the mapping. The corresponding population stability indices may be referred to as critical values.

At step 218, the population stability index, relative to the first population distribution, may be calculated for the second population distribution.

At step 220, the population stability index calculated in step 218 may be compared to a critical value (as identified in step 216).

At step 222, status information may be transmitted. The status information may be based on the comparison in step 220. For example, the transmission may include transmission of a message that states that a critical value was met or exceeded.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Figure 3:
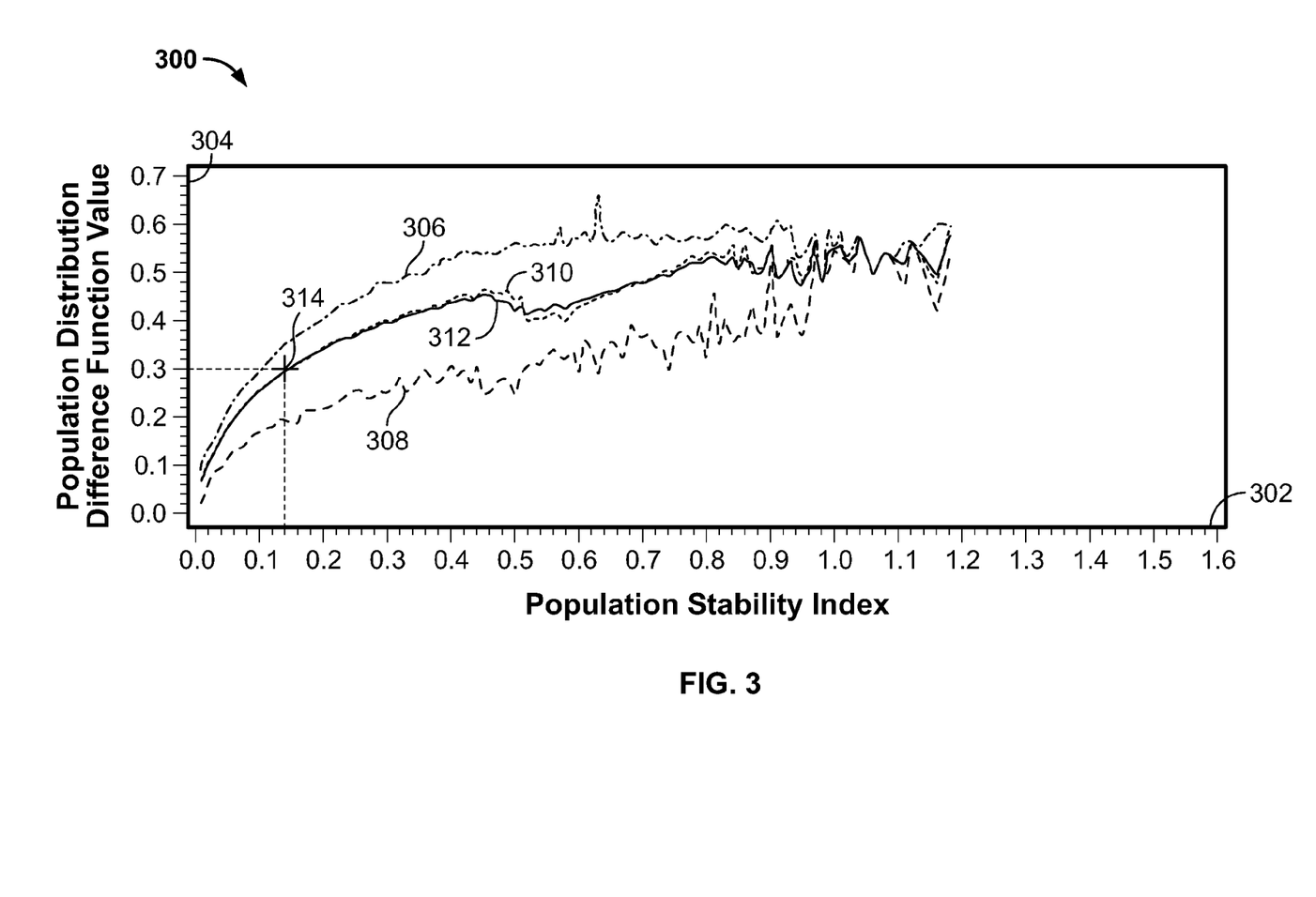
FIG. 3 shows data that may be used in accordance with the principles of the invention.

FIG. 3 shows illustrative graph 300. Horizontal axis 302 includes population stability indices. The population indices range from 0 to 1.6. Vertical axis 304 includes population distribution difference function values. The population distribution difference function values range from 0 to 0.7.

The population stability indices corresponding to the hypothetical third population distributions were divided into evenly spaced bins so that each bin corresponds to one or more third population distributions. For each of the third population distributions, there is a corresponding population distribution difference function value. Thus, in each bin, there is a set of one or more population difference function values. The maximum (306), minimum (308), median (310) and mean (312) values in the set are shown, relative to vertical axis 304, in graph 300.

In some embodiments, the population difference function values corresponding to the hypothetical third population distributions may be divided into evenly spaced bins so that each bin corresponds to one or more third population distributions. For each of the third population distributions, there would then be a corresponding population stability index. Thus, in each bin, there is a set of one or more population stability indices. Maximum, minimum, median and mean values of the population stability indices may then be calculated and used for selecting a population stability index critical value.

For example, a user may desire to quantify a difference between a first population distribution and a second population distribution. The user may generate a family of hypothetical third population distributions. the third population distributions may have any functional form (e.g., linear, non-linear, monotonic, monomodal, bimodal, etc.).

The user may select the absolute difference function (Eqn. 3) as the population distribution difference function. The absolute difference function values and population stability indices, relative to the first population distribution, may be calculated for the hypothetical third population distributions. The absolute difference function values may be plotted in graph 300 against the population stability indices.

The user may identify a value such as 0.3 as a significant population distribution difference function value. Point 314 on graph 300, which corresponds to that population distribution difference function value, may be used to define a critical value (0.14 in this example) of the population stability index. The user may then monitor the population stability index for the second population distribution relative to the first population distribution. If the population stability index reaches or exceeds the critical value (0.14), the significant difference will have occurred.

Figure 4:
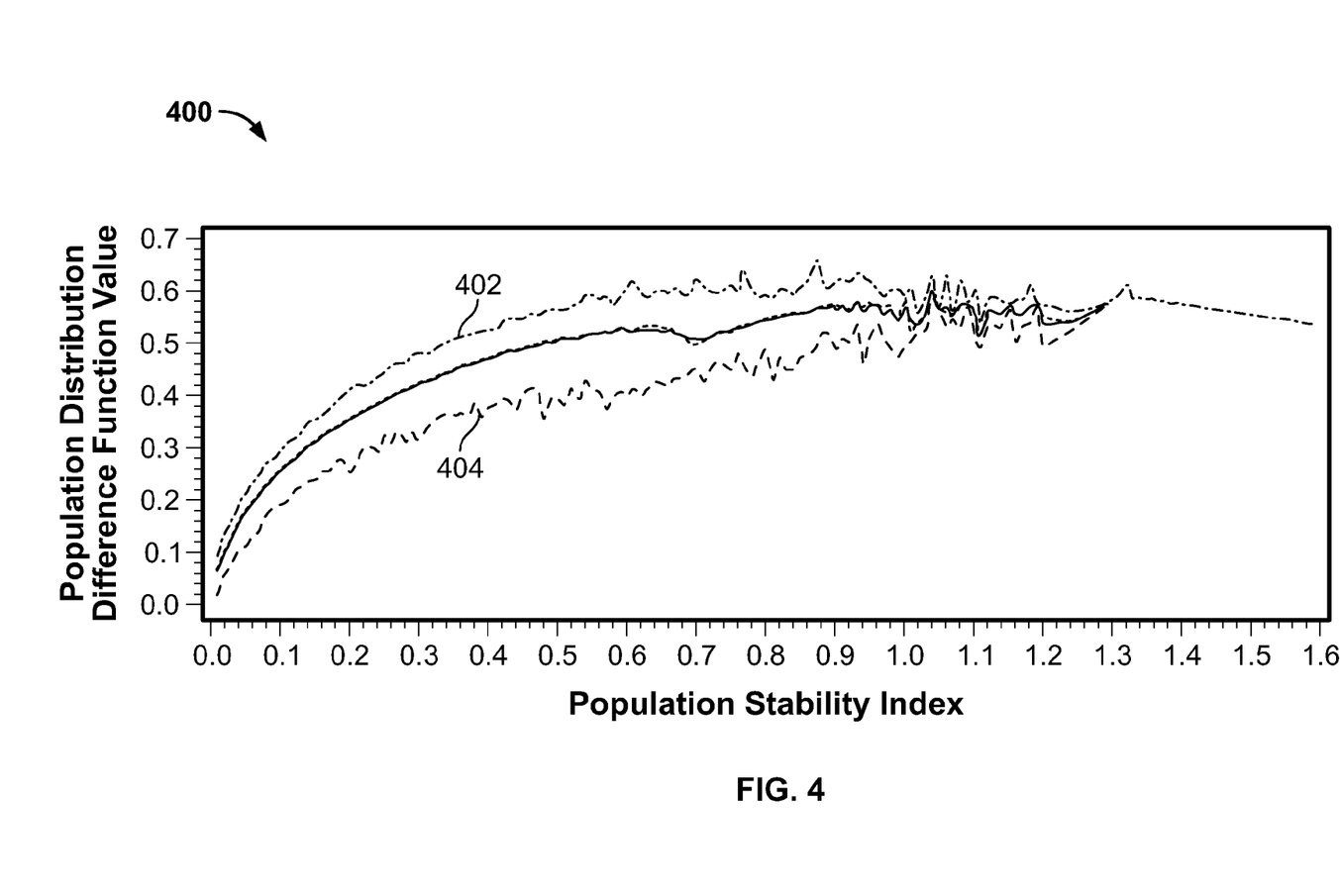
FIG. 4 shows a subset of the data shown in FIG. 3.

FIG. 4 shows illustrative graph 400, which shows maximum (404), minimum (406), median (408) and mean (408) population distribution difference function values (vertical axis) that correspond to population stability indices (horizontal axis). (As discussed in connection with graph 300 (shown in FIG. 3), the population difference function values corresponding to the hypothetical third population distributions may be divided into evenly spaced bins so that each bin corresponds to one or more third population distributions. For each of the third population distributions, there would then be a corresponding population stability index. Thus, in each bin, there is a set of one or more population stability indices. Maximum, minimum, median and mean values of the population stability indices may then be calculated and used for selecting a population stability index critical value.)

The correspondence between the population distribution difference function values and the population stability indices is based on a family of hypothetical third population distributions that are linearly or monotonically increasing. The data shown in FIG. 4 may be a subset of the data shown in FIG. 3. In some embodiments of the invention, the mapping of population distribution difference onto population stability index may be the same for hypothetical third population distributions such as those in graph 300 (shown in FIG. 3) and those in graph 400.

Table 3 shows illustrative source code for algorithms that generate hypothetical third population distributions such as those ("non-linear") underlying the data in graph 300 (shown in FIG. 3) and those ("linear") underlying the data in graph 400 (shown in FIG. 4). The source code is in a format compatible with a suitable statistical analysis package. The index ii corresponds to distribution decile.

TABLE 3

Illustrative source code.

| "Non-linear" | "Linear" |
|---|---|
| do ii = 1 to 10;<br>if ii <=5 then do;<br><br>matrix$^1$ [ii,2] = (10 + (−1.5 + a*4) * (ii−5) + rannor$^2$ (495228))/100;<br>end;<br>else do;<br>matrix$^1$ [ii,2] = (10 + (−1.5 + b*4) * (ii−5) + rannor$^2$ (495228))/100;<br>end;<br>end; | do ii = 1 to 10;<br>matrix$^1$ [ii,2] = (10 + (−1.5 + a*4) * (ii−5) + rannor$^2$ (495228))/100;<br>end; |

[1]MATRIX is a user-defined two-dimensional array for storing decile-binned random values.
[2]RANNNOR is a SAS-defined random normal distribution function.

Thus, systems and methods for quantifying a difference between a first population distribution data set and a second population distribution data set have been provided. Persons skilled in the art will appreciate that the present invention can be practiced by other than the described embodiments, which are presented for purposes of illustration rather than of limitation. The present invention is limited only by the claims that follow.

What is claimed is:

1. A method for quantifying a difference between a first population distribution data set and a second population distribution data set, the method comprising:

using a machine computational module, mapping a population stability index to a population distribution difference function;

using the machine computational module, evaluating the population stability index based on the mapping, the first population distribution data set and the second population distribution data set;

using a receiver in electronic communication with the computational module, receiving a population stability index critical value corresponding in the mapping to a population distribution difference function value;

storing the population stability index value in machine readable memory; and using the machine computational module, comparing the critical value to the population stability index based on the first population distribution data set and the second population distribution data set.

2. The method of claim 1 further comprising activating an alert if the population stability index based on the first population distribution data set and the second population distribution data set satisfies a criterion based on the critical value.

3. The method of claim 2 wherein the criterion requires that the population stability index based on the first population distribution data set and the second population distribution data set be greater than the critical value.

4. A method for quantifying a difference between a first population distribution data set and a second population distribution data set, the method comprising:

using a machine computational module, mapping a population stability index to a population distribution difference function; and using the machine computational module, evaluating the population stability index based on the mapping, the first population distribution data set and the second population distribution data set;

wherein the mapping comprises:

evaluating the population stability index based on the first population distribution data set and a third population distribution data set;

evaluating the population distribution difference function based on the first population distribution data set and the third population distribution data set; and expressing a relationship between the evaluated population stability index and the evaluated population distribution difference function.

5. The method of claim 4 wherein the third population distribution data set is one of a plurality of third population distribution data sets.

6. The method of claim 5 wherein each of the plurality of third population distribution data sets is generated based on a random process.

7. The method of claim 6 wherein the process is a Monte Carlo simulation.

8. A method for quantifying a difference between a first population distribution data set and a second population distribution data set, the method comprising:

using a machine computational module, mapping a population stability index to a population distribution difference function; and using the machine computational module, evaluating the population stability index based on the mapping, the first population distribution data set and the second population distribution data set;

wherein the population distribution difference function depends on a difference between a proportion of population members that are assigned to a score range in a third population distribution data set and proportion of population members that are assigned to the score range in the first population distribution data set.

9. The method of claim 8 wherein the difference is an absolute difference.

10. The method of claim 9 wherein:
the score range is one of a plurality of subsets of score values, the score values being the independent variable for the first and third population distributions; and
the population difference distribution function is the sum of the absolute differences that correspond to the subsets.

11. One or more non-transitory computer-readable media storing computer-executable instructions which, when executed by a processor on a computer system, perform a method for quantifying a difference between a first population distribution data set and a second population distribution data set, the method comprising:
mapping a population stability index to a population distribution difference function;
evaluating the population stability index based on the mapping, the first population distribution data set and the second population distribution data set wherein the method further comprises:
receiving a population stability index critical value corresponding in the mapping to a population distribution difference function value;
storing the population stability index value in machine readable memory; and
comparing the critical value to the population stability index based on the first population distribution data set and the second population distribution data set.

12. The media of claim 11 wherein the method further comprises activating an alert if the population stability index based on the first population distribution data set and the second population distribution data set satisfies a criterion based on the critical value.

13. The media of claim 12 wherein, in the method, the criterion requires that the population stability index based on the first population distribution data set and the second population distribution data set be greater than the critical value.

14. One or more non-transitory computer-readable media storing computer-executable instructions which, when executed by a processor on a computer system, perform a method for quantifying a difference between a first population distribution data set and a second population distribution data set, the method comprising:
mapping a population stability index to a population distribution difference function; and
evaluating the population stability index based on the mapping, the first population distribution data set and the second population distribution data set
wherein, in the method, the mapping comprises:
evaluating the population stability index based on the first population distribution data set and a third population distribution data set;
evaluating the population distribution difference function based on the first population distribution data set and the third population distribution data set; and
expressing a relationship between the evaluated population stability index and the evaluated population distribution difference function.

15. The media of claim 14 wherein, in the method, the third population distribution data set is one of a plurality of third population distribution data sets.

16. The media of claim 15 wherein, in the method, each of the plurality of third population distribution data sets is generated based on a random process.

17. The media of claim 16 wherein the process is a Monte Carlo simulation.

18. One or more non-transitory computer-readable media storing computer-executable instructions which, when executed by a processor on a computer system, perform a method for quantifying a difference between a first population distribution data set and a second population distribution data set, the method comprising:
mapping a population stability index to a population distribution difference function; and
evaluating the population stability index based on the mapping, the first population distribution data set and the second population distribution data set;
wherein, in the method, the population distribution difference function depends on a difference between a proportion of population members that are assigned to a score range in a third population distribution data set and proportion of population members that are assigned to the score range in the first population distribution data set.

19. The media of claim 18 wherein, in the method, the difference is an absolute difference.

20. The media of claim 19 wherein, in the method:
the score range is one of a plurality of subsets of score values, the score values being the independent variable for the first and third population distributions; and
the population difference distribution function is the sum of the absolute differences that correspond to the subsets.

21. Apparatus for quantifying a difference between a first population distribution data set and a second population distribution data set, the apparatus comprising:
a machine computational module configured to:
map a population stability index to a population distribution difference function; and
evaluate the population stability index based on the mapping, the first population distribution data set and the second population distribution data set;
a receiver in electronic communication with the computational module, the receiver configured to receive a population stability index critical value corresponding in the mapping to a population distribution difference function value; and
machine readable memory configured to store the population stability index value;
wherein the machine computational module is further configured to compare the critical value to the population stability index based on the first population distribution data set and the second population distribution data set.

22. The apparatus of claim 21 further comprising an output device that is configured to transmit an alert if the population stability index based on the first population distribution data set and the second population distribution data set satisfies a criterion based on the critical value.

23. The apparatus of claim 22 wherein:
the machine computational module is further configured to:
evaluate the population stability index based on the first population distribution data set and a third population distribution data set; and
evaluate the population distribution difference function based on the first population distribution data set and the third population distribution data set; and
the output device is configured to output a relationship between the evaluated population stability index and the evaluated population distribution difference function.

* * * * *